Dec. 29, 1931.   J. WAHL   1,838,166
PRESSURE GAUGE
Filed Jan. 25, 1929
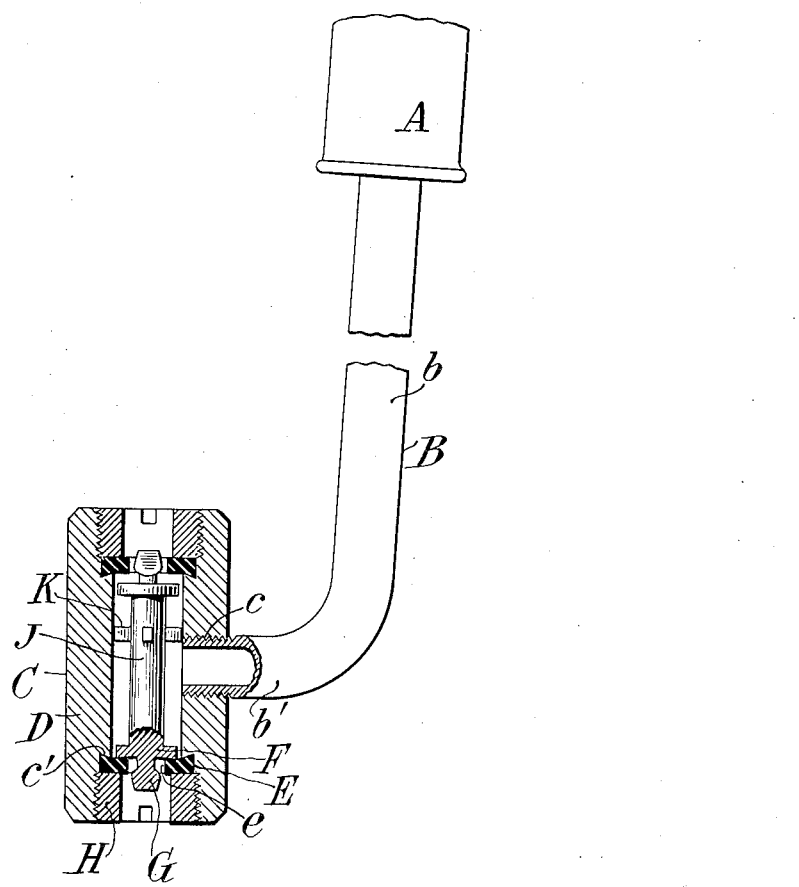
INVENTOR:
John Wahl,
By Attorneys,
Fraser, Myers & Manley.

Patented Dec. 29, 1931

1,838,166

UNITED STATES PATENT OFFICE

JOHN WAHL, OF ROSEDALE, NEW YORK, ASSIGNOR TO A. SCHRADER'S SON, INCORPORATED, OF BROOKLYN, NEW YORK, A CORPORATION OF NEW YORK

PRESSURE GAUGE

Application filed January 25, 1929. Serial No. 334,935.

The present invention relates to pressure gauges for pneumatic tires and aims to provide certain improvements therein. More particularly the invention relates to the construction and arrangement of the so-called deflating foot of such gauges whereby the gauging of the pressures in dual or twin pneumatic tires, as well as other tires provided with either radial or angular valve stems, is facilitated.

In bus transportation and heavy trucking, the present tendency is to employ pneumatic tires, and because of the load which these tires must sustain, they are usually mounted in pairs on each of the rear wheels and frequently also in pairs at the front wheels. These tires are provided with either straight or angular valve stems, which render the gauging of the inner one of a pair of dual or twin tires inconvenient with the conventional type of tire gauge, and especially so where disk wheels are employed.

According to the present invention I provide any conventional type of tire pressure gauge with a substitute or modified foot portion, which, without rendering the gauge unhandy, facilitates the gauging operation of tires provided with either straight or angular valve stems, and especially the inner and the outer tires of a pair of dual or twin tires irrespective of the type of wheel upon which they are mounted. The substitute or modified foot portion in reality has two so-called deflating feet, one of which is most conveniently adapted for use in gauging tires provided with radial valve stems, and the other for gauging tires provided with angular valve stems; and said deflating feet are so related to each other that either may be used without disconnection or adjustment whatever.

A preferred embodiment of my invention is illustrated in the accompanying drawing, the single figure of which shows the foot portion in section, and the connecting fitting and portion of a gauge housing in elevation.

Referring now to the drawing, let A indicate a gauge housing of any preferred construction, herein shown as a fractional part of the outer casing of a pencil type of tire pressure gauge. B indicates a substantially right-angled tubular fitting having a long arm $b$ and a short arm $b'$. The terminal of the long arm $b$ is connected in any approved manner with a leak-tight joint to the bottom of the gaugé housing A; and the terminal of the short arm $b'$ is connected to the gauge foot portion indicated generally by the reference character C, through the medium of a screw-threaded joint $c$ substantially midway the ends of said housing.

The foot portion C as herein shown comprises a tubular element D formed at each end with a deflating foot consisting of a packing gasket E, a check valve F adapted to seat against said packing gasket and a tire valve unseating means G which is integral with the valve F and extends through a central opening $e$ in the gasket E. The gasket E is held in place against a shoulder $c'$ within the housing C through the medium of a screw-threaded bushing H. It will be noted that the inner diameter of the bushing is slightly greater than the opening $e$ in the gasket; and that the tire valve unseating means G extends through the opening in the gasket a substantial distance. This construction is such that when the deflating foot is pressed upon the end of a tire valve stem the tire valve unseating means G will engage the valve pin and unseat the tire valve, and simultaneously therewith the gasket E will form a leak-tight joint with the top of said tire valve stem; also that simultaneous with this action the check valve F will be unseated to permit air from the tire to pass into the housing C, and through the tubular fitting B into the gauge.

At the opposite end of the foot portion C a second deflating foot is located of identical construction with that just described. The check valves of both deflating feet are integrally connected together by a stem J, said valves being positioned on said stem a distance apart, such that when one check valve is seated, the other will be unseated. It will thus be seen that when the foot portion is applied to a valve stem and one check valve F is unseated by having its tire valve unseating means G engage the valve pin of the tire valve, such unseating operation will positively close the other check valve and prevent leakage of the air from the tire to the atmosphere while gauging a tire.

To insure a proper guiding of the check valves F within the housing C, the stem J may be fitted with a suitable spider K.

From an inspection of the drawings it will be seen that the axis of the foot portion C, or, in other words the common axis of the two deflating feet, extends in substantially the same general direction as the long arm $b$ of the tubular fitting. Because of this arrangement of parts, the upper deflating foot, as viewed in the drawing, is conveniently adapted to engage a radially-extending valve stem which passes through a rim or through a disk wheel in proximity to an accessible edge of the rim or accessible face of the disk, whereas the lower deflating foot is conveniently adapted to engage an angled valve stem or fitting having a terminal extending substantially parallel to the axis of the wheel.

The invention, it will be apparent, is susceptible to changes in the details of construction and arrangement of parts, and I therefore do not wish to be limited to the specific embodiment described, but deem it within the spirit of my invention to deviate therefrom within the scope of the appended claims.

What I claim is:

1. For use with a pneumatic tire pressure gauge or the like, a chuck comprising a body member having a bore therethrough and a fluid passage leading from said bore to the gauge, a deflating foot at each end of the bore, a check valve for each deflating foot, a stem connecting both check valves, said stem being movable in said bore and permitting free communication between a deflating foot and the passage to the gauge when the check valve controlling said deflating foot is unseated, and said stem serving to seat one check valve as the other check valve is unseated, whereby to selectively connect either deflating foot with the gauge.

2. For use with a pneumatic tire pressure gauge or the like, a chuck comprising a body member having a bore therethrough and a fluid passage leading from said bore to the gauge, a deflating foot at each end of the bore, said deflating feet being in alignment with each other, a check valve for each deflating foot, a stem connecting both check valves, said stem being movable in said bore and permitting free communication between a deflating foot and the passage to the gauge when the check valve controlling said deflating foot is unseated, and said stem serving to seat one check valve as the other check valve is unseated, whereby to selectively connect either deflating foot with the gauge.

In witness whereof, I have hereunto signed my name.

JOHN WAHL.